United States Patent
Fan

(10) Patent No.: US 9,120,432 B2
(45) Date of Patent: Sep. 1, 2015

(54) APPARATUS FOR SECURING ELECTRONIC DEVICE IN VEHICLE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Xiao-Fei Fan, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/182,300

(22) Filed: Feb. 18, 2014

(65) Prior Publication Data

US 2014/0332574 A1    Nov. 13, 2014

(30) Foreign Application Priority Data

May 8, 2013    (CN) .................. 2013 1 01656206

(51) Int. Cl.
| | |
|---|---|
| *B60R 11/02* | (2006.01) |
| *B60J 7/06* | (2006.01) |
| *B60J 11/00* | (2006.01) |
| *B60R 11/00* | (2006.01) |

(52) U.S. Cl.
CPC .. *B60R 11/02* (2013.01); *B60J 7/06* (2013.01); *B60J 11/00* (2013.01); *B60R 2011/0017* (2013.01); *B60R 2011/0085* (2013.01)

(58) Field of Classification Search
CPC ........ B60R 11/02; B60R 11/0211; B62J 7/06; B62J 11/00
USPC .......................... 224/553, 545, 555, 567, 929
See application file for complete search history.

(56) References Cited

U.S. PATENT DOCUMENTS

| | | | | |
|---|---|---|---|---|
| 4,842,174 A | * | 6/1989 | Sheppard et al. | 224/548 |
| 5,086,958 A | * | 2/1992 | Nagy | 224/544 |
| 5,114,060 A | * | 5/1992 | Boyer | 224/413 |
| 5,187,744 A | * | 2/1993 | Richter | 379/449 |
| 5,779,205 A | * | 7/1998 | Ching | 248/205.8 |
| 6,041,986 A | * | 3/2000 | Wu | 224/274 |
| 6,062,518 A | * | 5/2000 | Etue | 248/231.21 |
| 6,213,438 B1 | * | 4/2001 | Ostby et al. | 248/276.1 |
| 6,216,927 B1 | * | 4/2001 | Meritt | 224/275 |
| 6,315,180 B1 | * | 11/2001 | Watkins | 224/275 |
| 6,371,345 B1 | * | 4/2002 | Leyden et al. | 224/553 |
| 6,386,413 B1 | * | 5/2002 | Twyford | 224/553 |

(Continued)

*Primary Examiner* — Brian D Nash
(74) *Attorney, Agent, or Firm* — Novak Druce Connolly Bove + Quigg LLP

(57) ABSTRACT

An apparatus for securing an electronic device within a vehicle includes a retention base, a loading base, and a hinge assembly hinged between the retention base and the loading base. The loading base includes a retaining member. The retaining member includes a ring-shaped main body. The hinge assembly includes a pivoting shaft, a joining member assembled to the retention base, a hinge member, and a locking member. The joining member and the hinge member are sleeved around the pivoting shaft and assembled together by the locking member. The hinge member includes a hinging portion, a connecting portion connected to the hinging portion, and a rotation portion extending from the connecting portion away from the hinging portion. The hinging portion is rotatably received and latched in the main body. The rotation portion is rotatably sleeved around the pivoting shaft.

20 Claims, 4 Drawing Sheets

(56) References Cited

U.S. PATENT DOCUMENTS

| | | | |
|---|---|---|---|
| 6,427,959 B1* | 8/2002 | Kalis et al. | 248/288.11 |
| 6,779,765 B2* | 8/2004 | Zheng et al. | 248/206.3 |
| 7,246,732 B1* | 7/2007 | Ha | 224/483 |
| 7,475,858 B2* | 1/2009 | Kalis et al. | 248/288.31 |
| 8,191,838 B2* | 6/2012 | Carter | 248/188.6 |
| 8,276,863 B2* | 10/2012 | Niwai et al. | 248/278.1 |
| 2006/0060733 A1* | 3/2006 | Tsai et al. | 248/205.2 |
| 2006/0215836 A1* | 9/2006 | Wang | 379/455 |
| 2011/0233250 A1* | 9/2011 | Nakajima et al. | 224/567 |

* cited by examiner

APPARATUS FOR SECURING ELECTRONIC DEVICE IN VEHICLE

This application claims all benefits accruing under 35 U.S.C. §119 from China Patent Application No. 201310126772.5, filed on Apr. 12, 2013, in the China Intellectual Property Office.

FIELD

The present disclosure generally relates to apparatuses for device retention, and particularly to an apparatus for securing an electronic device in a vehicle.

BACKGROUND

An apparatus for retaining or mounting an electronic device in a vehicle includes a retention base, a first support rod, a second support rod, a loading base, and two locking devices. The first support rod, the second support rod, the loading base, and the two locking devices are located on the retention base. The first support rod is rotatably connected to the second support rod via one locking device to adjust pitch angles of the loading base. The second support rod is connected to the loading base via another locking device to adjust horizontal rotation angles of the loading base. Each locking device includes a threaded rotation shaft and nuts. The first support rod and the second support rod are tightly fastened to the threaded rotation shafts via the nuts. However, it is inconvenient to adjust viewing angles of the electronic device because the nuts need to be loosened and refastened for each viewing angle adjustment.

Therefore, there is room for improvement within the art.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
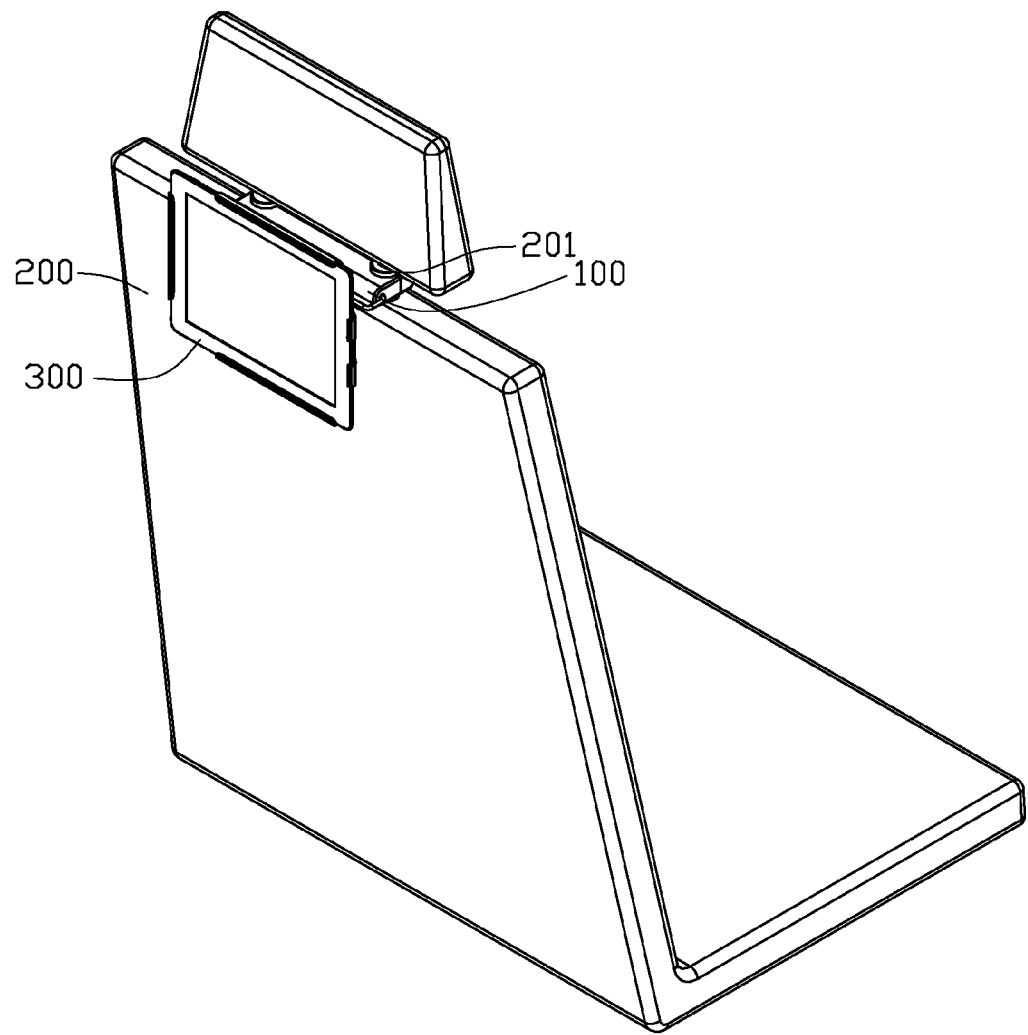
FIG. 1 is an assembled view of an embodiment of an apparatus for securing an electronic device onto a back portion of a seat of a vehicle.

FIG. 1 shows an apparatus 100 for securing an electronic device 300 onto a back portion of a seat 200. The seat 200 can be a seat of a vehicle (not shown). The seat 200 includes two mounting shafts 201. Also referring to FIGS. 2 through 4, the apparatus 100 includes a retention base 10, a loading base 30, and a hinge assembly 50. The hinge assembly 50 rotatably connects the retention base 10 and the loading base 30 together. The retention base 10 is mounted onto the back portion of the seat 200, and the electronic device 300 is securely retained by the loading base 30. The loading base 30 is capable of rotating around a rotation axis A and a rotation axis B via the hinge assembly 50 for adjusting viewing angles of the electronic device 300. In one embodiment, the rotation axis B is a vertical axis, and the rotation axis A is a horizontal axis.

The retention base 10 includes a fixing member 11 and two buffer members 13. The fixing member 11 is assembled to the seat 200. The buffer members 13 contact the seat 200 and absorb shock when the vehicle is in motion. The fixing member 11 includes a first fixing portion 112 and a second fixing portion 114 engaged with the first fixing portion 112. The first fixing portion 112 defines two substantially semicircular first installation recesses 1120 in an edge thereof. The second fixing portion 114 is substantially the same as the first fixing portion 112, and defines two substantially semicircular second installation recesses 1140 spatially arranged to be corresponding to the two first installation recesses 1120. Each first installation recess 1120 and the corresponding second installation recess 1140 cooperatively define an installing hole 115, and each buffer member 13 is received through one corresponding installing hole 115. The buffer member 13 is a substantially cylindrical and made of an elastic material. A slot 130 is defined in a sidewall of the buffer member 13 along a direction substantially parallel to an axis of the buffer member 13, thus allowing the buffer member 13 to sleeve around one corresponding mounting shaft 201 of the seat 200. The first fixing portion 112 and the second fixing portion 114 are fastened to the mounting shaft 201 via fasteners (not shown). In other embodiments, number or quantity of the first installation recesses 1120, the second installation recesses 1140, and the buffer members 13 can be adjusted according to actual requirements. Number or quantity of the first installation recesses 1120, the second installation recesses 1140, and the buffer members 13 correspond to a number of the mounting shafts 201. The retention base 10 can be other structures, such as a suction cup adhered to a flat portion of the vehicle.

The loading base 30 includes a loading member 32 and a retaining member 34. The retaining member 34 connects to the hinge assembly 50. The loading member 32 is used for receiving and fixing the electronic device 300. The loading member 32 includes a bottom wall 321, a plurality of sidewalls 323, and a latching wall 325. The plurality of sidewalls 323, the latching wall 325, and the bottom wall 321 cooperatively define a receiving space 320 for receiving the electronic device 300. The plurality of sidewalls 323 and the latching wall 325 extend from edges of the bottom wall 321. Each sidewall 323 includes an arcuate connecting portion 3231 and a stopping portion 3233 extending from a distal edge of the connecting portion 3231. The connecting portion 3231 is connected between the bottom wall 321 and the stopping portion 3233. The latching wall 325 is flexibly and rotatably connected to the bottom wall 321. The latching wall 325 is rotated away from the bottom wall 321 to allow the electronic device 300 to be received into the receiving space 320. The latching wall 325 includes a linking portion 3251 and a latching portion 3253 extending from an edge of the linking portion 3251. The linking portion 3251 is rotatably connected between the bottom wall 321 and the latching portion 3253.

In the illustrated embodiment, the bottom wall 321 is a substantial rectangular board. The plurality of sidewalls 323 and the latching wall 325 extend from respective edges of the bottom wall 321. A cutout 3230 is defined in a joint corner between each two adjacent sidewalls 323. In one embodiment, inner surfaces of the bottom wall 321, the latching wall 325, and the plurality of sidewalls 323 bounding the receiving space 320 are made of rubber for protecting a housing of the electronic device 300. Outer surfaces of the bottom wall 321, the latching wall 325, and the plurality of sidewalls 323 are made of plastic, which can be a stiff material. The linking portion 3251 is made of rubber to rotatably connect the latching portion 3253 to the bottom wall 321. In other embodiments, the inner surfaces of the bottom wall 321, the latching wall 325, and the plurality of sidewalls 323 can be made of other soft materials.

The retaining member 34 is located on the outer surface of the bottom wall 321. The retaining member 34 includes a main body 341, a plurality of mounting portions 343, and a plurality of positioning portions 345. The main body 341 is substantially ring-shaped. The mounting portions 343 protrude from an inner wall of the main body 341 and are spaced from each other. A mounting opening 3430 is defined in an end surface of each mounting portion 343. The positioning portions 345 protrude from the inner wall of the main body 341. The plurality of positioning portions 345 and the plurality of mounting portions 343 are positioned along a same circular ring-shape as the main body.

The hinge assembly 50 includes two pivoting shafts 51, two joining members 53, a hinge member 55, two locking members 57, and four elastic members 59. One joining member 53, one end portion of the hinge member 55, and two second elastic members 59 are sleeved around one corresponding pivoting shaft 51 and fastened together along an axis of the pivoting shaft 51 by one corresponding locking member 57. The pivoting shaft 51 includes a threaded shaft portion 511 and an operation portion 513 protruding from the shaft portion 511. The joining member 53 includes a joining portion 531 and a sleeve portion 533 extending from an end of the joining portion 531. The joining portion 531 is a substantially U-shaped bent rod, and is fixedly connected to one corresponding end portion of the second fixing portion 114. The sleeve portion 533 is substantially ring-shaped, and sleeved around the shaft portion 511.

Figure 2:
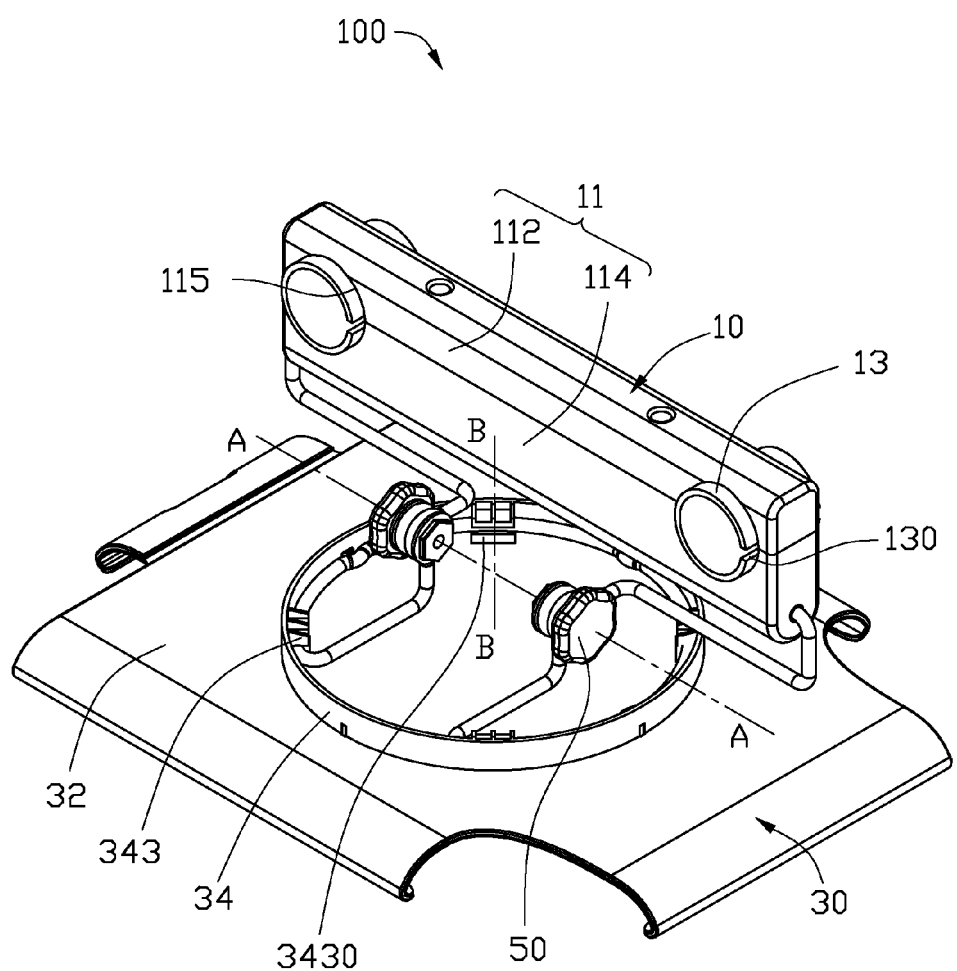
FIG. 2 is an assembled view of the apparatus of FIG. 1.
Figure 3:
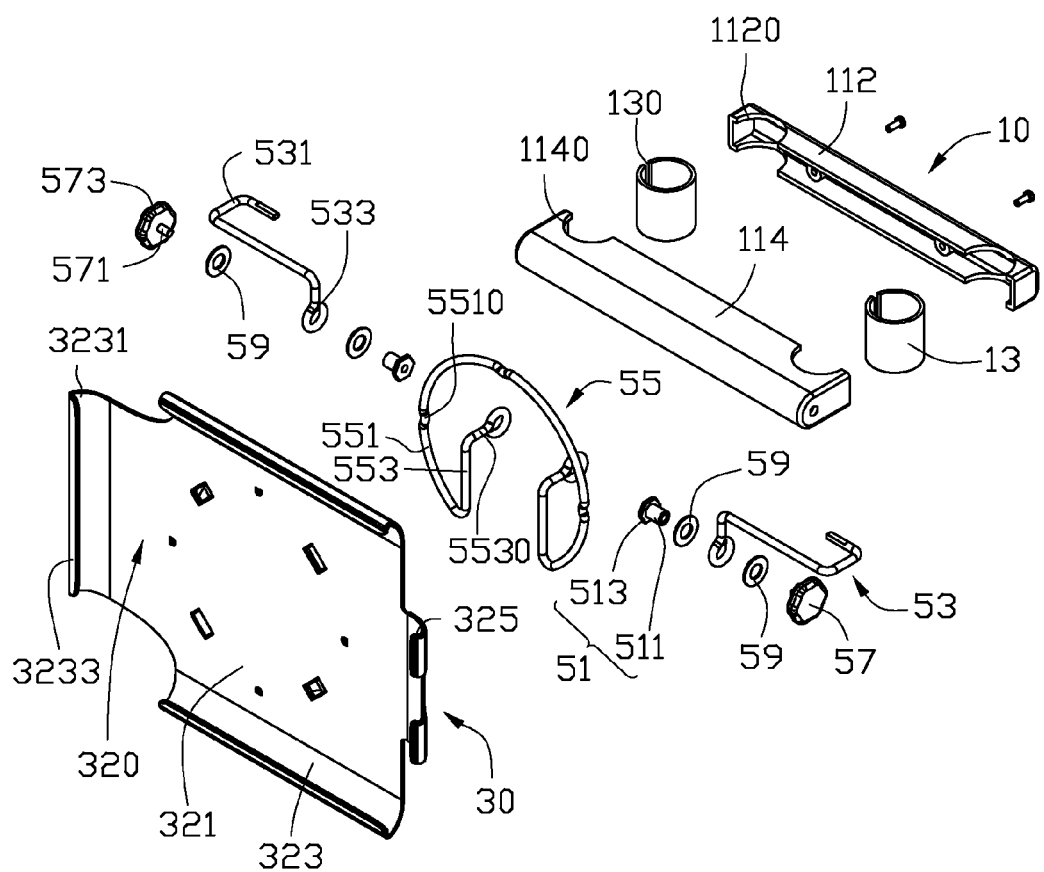
FIG. 3 is an exploded view of the apparatus of FIG. 1.
Figure 4:
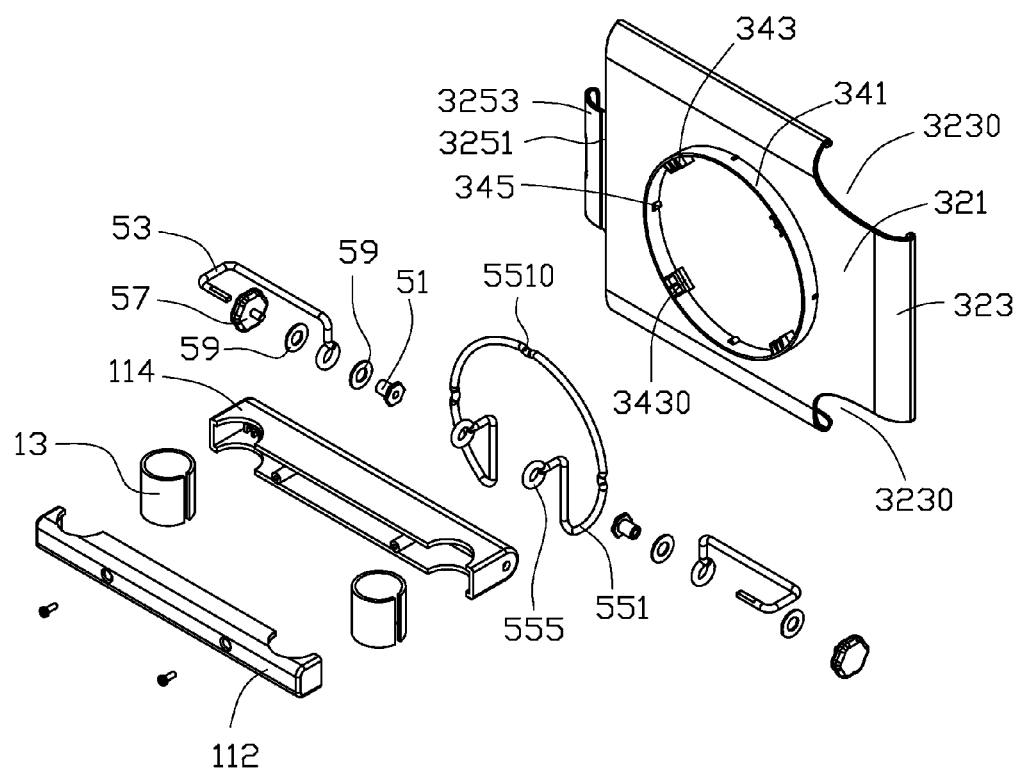
FIG. 4 is similar to FIG. 3, but viewed from another aspect.

The hinge member 55 includes a hinging portion 551, two connecting portions 553 and two rotation portions 555. The hinging portion 551 interconnects the two connecting portions 553. The hinging portion 551 is substantially C-shaped, received in the main body 341, and latched by the mounting portions 343 of the retaining member 34. The hinging portion 551 is deformable to rotate around an axis of the main body 341. The rotation axis B (as shown in FIG. 2) is coaxial with the axis of the main body 341. The hinge member 55 further forms a plurality of engaging portions 5510 protruding toward a central portion of the hinging portion 551 for engaging with the plurality of positioning portions 345, thus locking the hinging portion 551 in a preset position. The two connecting portions 553 extend from two respective ends of the hinging portion 551 toward an inner portion of the hinging portion 551. A distal end portion 5530 (as shown in FIG. 3) of the connecting portion 553 located distant from the hinging portion 551 is bent and extends substantially perpendicularly to a plane of the hinging portion 551. The annular rotation portion 555 (as shown in FIG. 4) is formed at a distal end of the distal end portion 5530. The rotation portion 555 is sleeved around the corresponding shaft portion 511 of the pivoting shaft 51. The rotation portion 555 is rotatable around an axis of the shaft portion 511. The rotation axis A (as shown in FIG. 2) is coaxial with the rotation axis of the rotation portion 555.

The locking member 57 includes a screwing portion 571 and a locking portion 573 formed at one end of the screwing portion 571. The screwing portion 571 is screwed into the shaft portion 511. The four elastic members 59 are divided into two groups. Each group of the elastic members 59 includes a first elastic member and a second elastic member. The first elastic member is aligned between the operation portion 513 and the connecting portion 553, and the second elastic member is arranged between the connecting portion 553 and the locking portion 573.

In one embodiment, the joining member 53 and the hinge member 55 are made of a stainless steel wire. The positioning portions 345 are semi-columnar posts. The engaging portions 5510 are arc-shaped recesses. In other embodiments, the joining member 53 and the hinge member 55 can be made of other elastic materials, such as titanium. The positioning portions 345 can be recesses, and the engaging portions 5510 can be protrusions to engage with the positioning portions 345. The hinge assembly 50 can include just one pivoting shaft 51, one joining member 53, one locking member 57, and one connecting portion 553. A sleeving arrangement of the joining member 53, the hinge member 55, and the elastic members 59 around the pivoting shaft 51 can also be changed. The hinging portion 551 can be a closed ring, and the connecting portions 553 can protrude from an inner wall of the hinging portion 551. In other embodiments, the locking member 57 and the pivoting shaft 51 can be omitted, and the end of the joining member 53 away from the retention base 10 can be a shaft directly pivoted with the rotation portion 555.

In assembly, the two joining members 53 are fixed to two end portions of the second fixing portion 114, respectively. The hinging portion 551 is compressed to be received in the mounting openings 3430. The hinging portion 551 restores in size and engages with the mounting portions 343. The pivoting shafts 51 are received through the corresponding first elastic member 59, the corresponding rotation portion 555, and the corresponding second elastic member 59 in that order, and fastened with the corresponding locking member 57.

The rotation axis A is substantially perpendicular to the rotation axis B for adjusting pitch angles and rotation angles of the electronic device 300. In use, the electronic device 300 is secured by the loading base 30 and received in the receiving space 320. The loading base 30 and the connecting portion 553 are rotated around the rotation axis A when the pitch angles of the electronic device 300 are adjusted. The loading base 30 and the hinging portion 551 are rotated around the rotation axis B when the horizontal rotation angles of the electronic device 300 are adjusted. Thus, the electronic device 300 can be positioned at a desired viewing angle.

As described above, the pitch angles and the horizontal rotation angles of the electronic device 300 can be adjusted by rotating the loading base 30. The inner surfaces of the sidewalls 323 and of the latching wall 325 are made of soft materials having a high coefficient of friction for protecting and stably fixing the electronic device 300. The linking portion 3251 is made of soft material for allowing the latching portion 3253 to be conveniently rotated toward and away from the bottom wall 321 of the loading member 32.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An apparatus for securing an electronic device in a vehicle, comprising:
   a retention base for being fixed in the vehicle;
   a loading base comprising a loading member and a retaining member positioned on the loading member, the loading member configured to hold the electronic device, and the retaining member comprising a substantially ring-shaped main body and a plurality of mounting portions separately protruding from an inner wall of the main body; and a hinge assembly connecting the retention base to the retaining member, the hinge assembly comprising a pivoting shaft, a joining member, a hinge member, and a locking member, the joining member and the hinge member sleeved on the pivoting shaft and fastened together by the locking member, the joining member assembled with the retention base and the hinge member, wherein the hinge member comprises a hinging portion, a connecting portion, and a rotation portion, the connecting portion interconnects the hinging portion and the rotation portion, the hinging portion is rotatably received and latched in the main body by the plurality of mounting portions, a distal end portion of the connecting portion distant from the hinging portion is bent, the rotation portion is formed at the distal end portion of the connecting portion and is rotatably sleeved around the pivoting shaft, and a rotation axis of the hinging portion is substantial vertical to a rotation axis of the rotation portion.

2. The apparatus of claim 1, wherein the retaining member further comprises a plurality of positioning portions protruded from the inner wall of the main body and spaced from each other, the plurality of positioning portions and the plurality of mounting portions are spaced apart from each other, the hinge member further comprises a plurality of engaging portions separately formed in the hinging portion and engaging with the plurality of positioning portions for locking the hinging portion in a preset position for positioning the hinging portion.

3. The apparatus of claim 1, wherein the hinging portion is substantially C-shaped and is capable of deforming along a radial direction.

4. The apparatus of claim 1, wherein the connecting portion extends towards an inner side of the hinging portion.

5. The apparatus of claim 4, wherein an end of the connecting portion away from the rotation portion extends towards a direction substantially perpendicular to a plane of the hinging portion.

6. The apparatus of claim 1, wherein the joining member comprises a joining portion and a sleeve portion extending from an end of the joining portion, the joining portion is bend and fixedly-connected to the retention base away from the sleeve portion, the sleeve portion sleeves on the pivoting shaft.

7. The apparatus of claim 1, wherein the retention base comprises a fixing member being assembled within the vehicle and a buffer member positioned between the fixing member and the vehicle.

8. The apparatus of claim 7, wherein the buffer member defines a slot in a sidewall of the buffer member.

9. The apparatus of claim 7, wherein the fixing member comprises a first fixing portion and a second fixing portion fastened and located oppositely to the first fixing portion, and the buffer member is positioned between the first fixing portion and the second fixing portion.

10. The apparatus of claim 1, wherein the loading member comprises a bottom wall and a plurality of sidewalls extending from edges of the bottom wall, the bottom wall and the plurality of sidewalls cooperatively form a receiving space for receiving the electronic device.

11. The apparatus of claim 10, wherein the loading member further comprises a latching wall rotatably connected with an edge of the bottom wall.

12. The apparatus of claim 11, wherein the latching wall comprises a linking portion and a latching portion extending from an edge of the linking portion, the linking portion is rotatably-connected between the bottom wall and the latching portion, an inner surface of the latching portion and the linking portion are made of a soft material, and an outer surface of the latching portion is made of a stiff material.

13. The apparatus of claim 11, wherein inner surfaces positioned towards the receiving space of the bottom wall and the sidewalls of the loading member are made of a soft material, and outer surfaces of the bottom wall and the sidewalls of the loading member are made of a stiff material.

14. An apparatus for securing an electronic device in a vehicle, comprising:

a retention base for being assembled within the vehicle;

a loading base comprising a loading member and a retaining member positioned on the loading member, the loading member configured to hold the electronic device; and a hinge assembly connecting the retention base to the loading base, the hinge assembly comprising a joining member assembled with the retention base and a hinge member hinged with the joining member, wherein the hinge member comprises a hinging portion, a connecting portion, and a rotation portion, the connecting portion interconnects the hinging portion and the rotation portion, the hinging portion is rotatably received and latched in the retaining member, a distal end portion of the connecting portion distant from the hinging portion is bent, the rotation portion is formed at the distal end portion of the connecting portion and is rotatably connected with the joining member away from the retention base, and a rotation axis of the hinging portion is substantial vertical to a rotation axis of the rotation portion.

15. The apparatus for securing an electronic device in a vehicle of claim 14, wherein the connecting portion extends towards an inside portion of the hinging portion.

16. The apparatus for securing an electronic device in a vehicle of claim 15, wherein the rotation portion extends towards a direction substantially perpendicular to a plane of the hinging portion.

17. The apparatus for securing an electronic device in a vehicle of claim 14, wherein the retaining member comprises a main body connected with the loading member and a plurality of mounting portions protruded from the inner wall of the main body and spaced from each other, the hinging portion is latched by the plurality of mounting portions.

18. The apparatus for securing an electronic device in a vehicle of claim 17, wherein the hinge member further comprises a plurality of engaging portions separately formed in the hinging portion, the retaining member further comprises a plurality of positioning portions protruded from the inner wall of the main body and spaced from each other, the plurality of positioning portions and the plurality of mounting portions are positioned at a same circular ring, the plurality of engaging portions engages with the plurality of positioning portions for locking the hinging portion in a preset position for positioning the hinging portion.

19. The apparatus for securing an electronic device in a vehicle of claim 18, wherein the plurality of engaging portions are recesses, and the plurality of positioning portions are protrusions.

20. The apparatus for securing an electronic device in a vehicle of claim 14, wherein the hinging portion is substantially C-shaped and is capable of deforming along radial direction.

* * * * *